United States Patent
Shah et al.

(10) Patent No.: US 11,650,904 B2
(45) Date of Patent: May 16, 2023

(54) ANALYSIS OF REAL-TIME SOFTWARE

(71) Applicant: Intrinsic Innovation LLC, Mountain View, CA (US)

(72) Inventors: Abhishek Shailesh Shah, Bossier City, LA (US); Gregory J. Prisament, East Palo Alto, CA (US); Michael Beardsworth, San Francisco, CA (US); Dmytro Hrybenko, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 629 days.

(21) Appl. No.: 16/724,977

(22) Filed: Dec. 23, 2019

(65) Prior Publication Data

US 2021/0191840 A1 Jun. 24, 2021

(51) Int. Cl.
*G06F 11/36* (2006.01)
*G06F 8/41* (2018.01)

(52) U.S. Cl.
CPC .......... *G06F 11/3612* (2013.01); *G06F 8/433* (2013.01)

(58) Field of Classification Search
CPC ............................ G06F 8/433; G06F 11/3612
See application file for complete search history.

(56) References Cited

U.S. PATENT DOCUMENTS

| | | | |
|---|---|---|---|
| 7,073,166 B2* | 7/2006 | Bera ................... | G06F 11/3672 717/130 |
| 10,365,905 B1* | 7/2019 | Ong ....................... | G06F 8/433 |
| 10,628,286 B1* | 4/2020 | Iyer ...................... | G06F 11/3612 |
| 11,301,357 B1* | 4/2022 | Gacek ................... | G06F 11/323 |
| 2006/0294502 A1* | 12/2006 | Das ........................... | G06F 8/73 717/129 |
| 2008/0235658 A1* | 9/2008 | Adi ........................... | G06F 8/20 717/108 |
| 2009/0328002 A1* | 12/2009 | Lin ...................... | G06F 11/3612 717/124 |
| 2018/0107585 A1* | 4/2018 | Ramesh .................. | G06F 8/443 |

(Continued)

OTHER PUBLICATIONS

Lee et al., "OpenMP to GPGPU: A Compiler Framework for Automatic Translation and Optimization", published by ACM, PPoPP'09, Feb. 14-18, 2009, Raleigh, North Carolina, USA, pp. 101-110 (Year: 2009).*

(Continued)

*Primary Examiner* — S. Sough
*Assistant Examiner* — Zheng Wei
(74) *Attorney, Agent, or Firm* — Fish & Richardson P.C.

(57) ABSTRACT

Methods, systems, and apparatus, including computer programs encoded on computer storage media, for performing real-time code analysis. One of the methods includes receiving a request to perform real-time code analysis on source code, wherein the request identifies one or more target source code elements. A plurality of real-time annotation values occurring in the source code for the target source code elements are identified. A call graph is generated for the one or more target source code elements. The call graph is traversed to identify one or more real-time violations, wherein each real-time violation is an instance in the source code that violates one or more real-time safe criteria. An output is provided that identifies one or more of the real-time violations occurring in the source code.

18 Claims, 4 Drawing Sheets

(56) References Cited

U.S. PATENT DOCUMENTS

2020/0183818 A1\* 6/2020 Guenther ............ G06F 11/3664
2020/0379879 A1\* 12/2020 Plotnik ................ G06F 21/577

OTHER PUBLICATIONS

Wikipedia.org [online], "Data-flow analysis," available on or before Dec. 15, 2005, via Internet Archive: Wayback Machine URL <https://web.archive.org/web/20051215000000/https://en.wikipedia.org/wiki/Data-flow_analysis>, retrieved Apr. 20, 2020, retrieved from URL <https://en.wikipedia.org/wiki/Data-flow_analysis>, 6 pages.

Wikipedia.org [online], "Static program analysis," available on or before Feb. 11, 2011, via Internet Archive: Wayback Machine URL <https://web.archive.org/web/20110211142121/https://en.wikipedia.org/wiki/Static_program_analysis>, retrieved on Apr. 20, 2020, retrieved from URL <https://en.wikipedia.org/wiki/Static_program_analysis>, 4 pages.

\* cited by examiner

ANALYSIS OF REAL-TIME SOFTWARE

BACKGROUND

This specification relates to real-time software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position.

The strict timing requirements of real-time software control systems are often implemented for user safety. For example, when humans work in close proximity to massive and powerful industrial robots, malfunctions in the control software can result in serious injury. Thus, halting operation when a fault state is reached can reduce the risk of injury due to errors in the control software.

SUMMARY

This specification describes how a system can perform code analysis on source code for a real-time software control system in order to automatically identify violations of one or more real-time safety criteria. The system can traverse a call graph of source code elements in order to identify call patterns that could potentially violate the timing requirements of a real-time software control system.

Particular embodiments of the subject matter described in this specification can be implemented so as to realize one or more of the following advantages. The techniques described below allow a real-time code analysis system to comprehensively and automatically identify potential real-time violations in source code for a real-time software control system. This process improves the reliability and efficiency of the real-time system by eliminating potential fault scenarios and makes the system safer overall for human operators. These techniques also provide a better developer experience because the errors are reported during development and not during runtime. In addition, developers statically get a global view of the code due to having access to the source code. In addition, the generality of the framework described below is able to support arbitrary queries over call graphs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
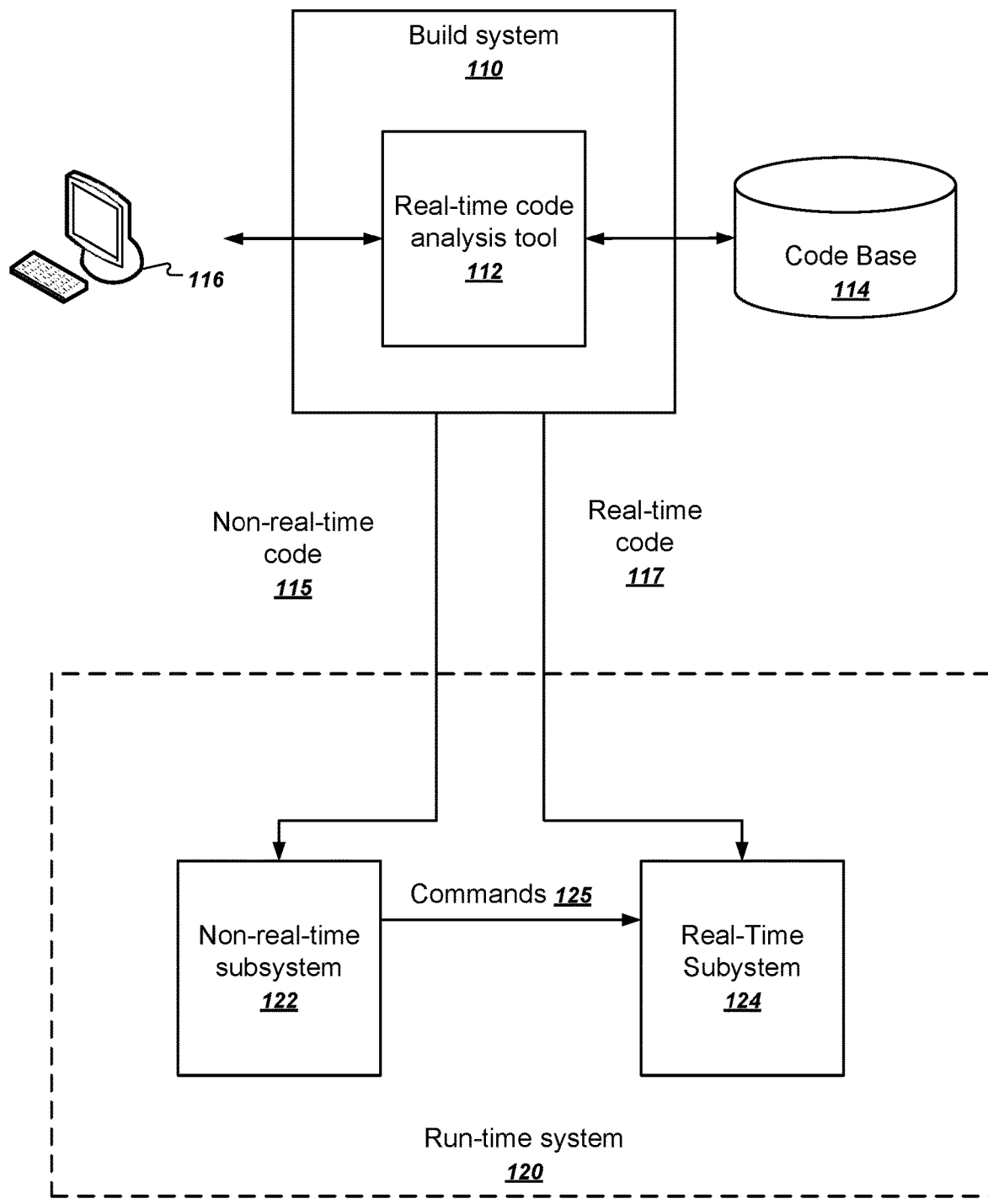
FIG. 1 is a diagram of an example system

FIG. 1 is a diagram of an example system 100. The system 100 is an example of a distributed computing system in which the techniques described in this specification can be implemented.

The system 100 includes a build system 110 and a run-time system 120. In general, the build system 110 takes input from a code base 114 and generates executable components for the run-time system, e.g., executable binaries, scripts, as well as supporting libraries and other utilities, to name just a few examples.

The build system 110 can be implemented as any appropriate system of one or more computers. The build system 110 can have installed compilers and other build system utilities for building code in the code base 114 for use by the run-time system 120.

The run-time system 120 includes both a real-time subsystem 124 and a non-real-time subsystem 122. The real-time subsystem 124 executes real-time code 117, and the non-real-time subsystem 122 executes non-real-time code 115. In practice, this means that the real-time code 117 can cause the real-time subsystem 124 to fault if timing requirements are violated. On the other hand, the non-real-time code 115 is generally under no such restrictions when running on the non-real-time subsystem 122.

As one example, the real-time subsystem 124 can be a real-time software control system for controlling a physical device, e.g., a robot. The non-real-time subsystem 122 can be a computer system that generates, in non-real-time, plans to be executed by the robot in real time. During operation, the non-real-time subsystem 122 can provide commands 125 to be executed by the real-time subsystem 124 in order to effectuate the plan generated by the non-real-time subsystem 122.

Because of communicative coupling between the non-real-time subsystem 122 and the real-time subsystem 124, the software for both systems is typically maintained in the same code base 114. However, in order to adhere to the strict real-time requirements, developers of the software generally want only real-time safe code to be executed in real-time on the real-time subsystem 124. In contrast, the non-real-time subsystem 122 can execute any kind of code, e.g., real-time safe code and non-real-time safe code.

In this specification, real-time safe code is software code that satisfies one or more real-time safe criteria. The real-time safe criteria depends on the implementation and parameters of the real-time subsystem 124. Typically, the real-time safe criteria relate to the timing requirements of the real-time subsystem 124. For example, if the timing requirements dictate that an action has to be executed within 100 milliseconds, the system could compute worst-case run-time estimates for functions in the code base 114 and designate as real-time-safe any functions having worst-case run-time estimates lower than some fraction of 100 milliseconds.

However, from the source code alone it is not always so straightforward to determine whether a function meets the real-time safe criteria. There are many examples of functions, even low-level functions, that do not have a deterministic runtime. These include functions with iterative loops; functions with recursion; system functions that relate to thread management, e.g., to yield, sleep, or create a thread; system functions that relate to allocating and deallocating memory or other storage space; functions that communicate with other threads, e.g., using remote-procedure calls and networking calls; and functions that are defined by or that call third-party library routines, to name just a few examples.

Thus, the build system 110 includes a real-time code analysis tool 112 that can analyze the source code in the code base 114 and to determine when code that should be executed in real-time is potentially is not real-time safe. This can be an important safety enhancement because some risk may always exist for humans to introduce code that is not real-time safe into the real-time subsystem.

Note that during startup and initialization of the real-time subsystem 124, the real-time subsystem 124 can execute code that is not real-time safe. However, at a certain point the real-time subsystem will cross a boundary into real-time execution. After crossing this boundary and beginning real-time execution, the real-time subsystem 124 should not be executing code that is not real-time safe.

The real-time code analysis tool 112 can communicate with a user device 116. The real-time code analysis tool 112 can receive target source code elements to analyze, and can provide, in response back to the user device 116, an identification of real-time violations. A real-time violation is data that represents an instance in the source code that violates one or more real-time safe criteria. Examples of real-time safe criteria are described in more detail below.

In order to identify real-time violations, the real-time code analysis tool 112 can perform a call-graph analysis on the code base 114. Because call-graphs can be quite large, the real-time code analysis tool may employ many computers, e.g., tens, hundreds, or thousands of computers, in a distributed computing system in order to parallelize the analysis of the call graph of the code base 114.

Developers can then use the results provided by the real-time code analysis tool 112 to modify code in the code base as necessary to achieve real-time safety. For example, the system can automatically suggest modifications for the developers to make based on the analysis. When developers are satisfied with the real-time safety of the code, the developers can instruct the build system 110 to generate the executable non-real-time code 115 and the real-time code 117 for execution on the run-time system 120.

Figure 2:
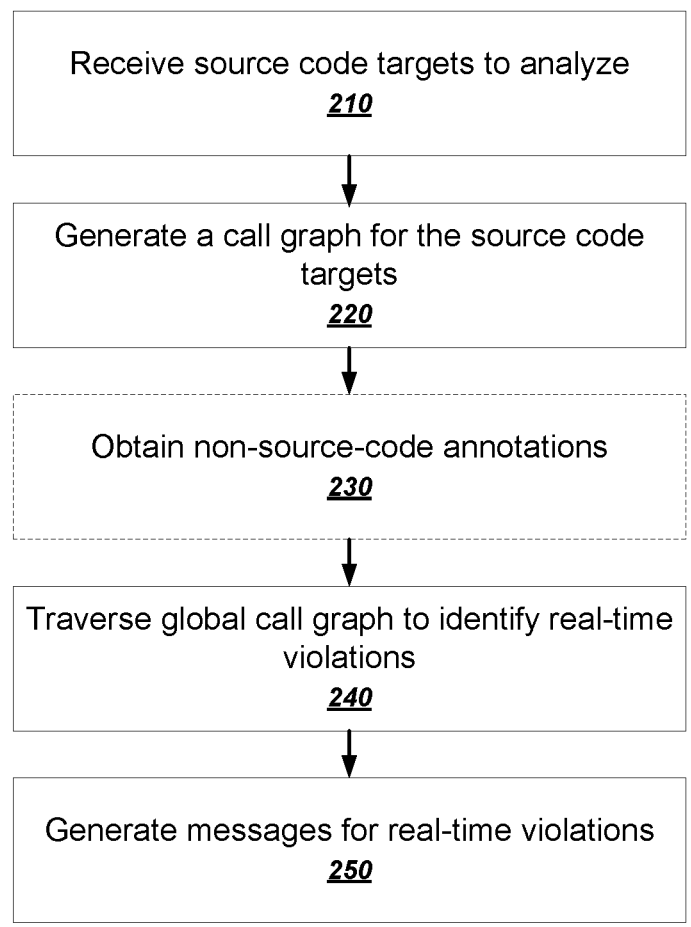
FIG. 2 is a flowchart of an example process for analyzing real-time code.

FIG. 2 is a flowchart of an example process for analyzing real-time code. The example process can be performed by a system of one or more computers programmed in accordance with this specification. The example process will be described as being performed by a system of one or more computers, e.g., the real-time analysis tool 112 of FIG. 1.

The system receives source code targets to analyze (210). For example, a user of a user device can specify which combination of functions or files in a code base to analyze, e.g., by providing a configuration file having the file paths and names of functions to be analyzed. A user can alternatively or in addition specify the names of files to be analyzed rather than functions. The system can then analyze all functions in the named files.

Alternatively or in addition, the system can analyze all functions having a particular real-time annotation. In this specification, real-time annotation is a user-specified portion of text that occurs in a source code file and which designates the value of a real-time code analysis property for one or more source code elements. In other words, the real-time annotation designates how real-time analysis should treat the function when being checked for real-time safety without affecting how the program would actually be executed in a real-time or non-real-time system.

A real-time annotation can have one of multiple values. A check real-time value can indicate that the function should be checked for real-time safety. In this specification, the example check real-time value "CHECK_REAL_TIME_SAFE" will be used to indicate a function that should be checked for real-time safety.

A non-real-time only value can indicate that the function should only be executed in a non-real-time context. In this specification, the example non-real-time only value "NON_REAL_TIME_ONLY" will be used to indicate a function that should be executed only in a non-real-time context only.

An ignore real-time value can indicate that the function should be ignored for the purposes of real-time code analysis. In this specification, the example ignore real-time value "IGNORE_REAL_TIME" will be used to indicate a function that should be ignored by the real-time code analysis.

These example real-time annotation values are merely illustrative, and any other appropriate character sequence can be used alternatively or in addition to specify the different real-time annotation values. In addition, a system can support a subset of these example real-time annotation values. For example, a system can perform real-time code analysis using only a check real-time value. The system can infer that the annotations for all other functions implicitly have non-real-time only annotation values.

A real-time code analysis tool can be configured to identify real-time annotations occurring within source code files by identifying certain character sequences that indicate the value of a real-time annotation. The character sequences can have different forms depending on which programming language is in use. In some implementations, the system can be configured to recognize real-time annotations by special reserved characters in the programming language. For example, a real-time annotation can start with a comment character sequence so that the value of the real-time annotation is ignored by the compiler. The real-time code analysis tool can then parse all comments attached to the target source code elements in order to identify values of real-time annotations.

Alternatively or in addition, a real-time annotation can begin with a non-comment character sequence that nevertheless does not affect execution of the program. For example, the real-time code analysis tool can use a specially defined character sequence that includes a value for the real-time annotation. A companion compiler of the build system can also be reconfigured to ignore such real-time annotations within the source code.

Alternatively or in addition, a real-time code analysis tool can be configured to identify real-time annotations from the names of source code targets. For example, in some implementations a user could specify a function to be checked for real-time safety by prepending or appending the check real-time value to a function name. For example, a user could rename a function "foo" to be "CHECK_REAL_TIME_foo."

The system generates a call graph for the source code targets (220). A call graph is a graph with nodes and directed edges, with each node being a source code function and each edge from a first node to a second node representing that a first function represented by the first node includes a call to a second function represented by the second node. In order to generate the call graph from the source code targets, the system can obtain all transitive dependencies for the source code targets, which can include code from other source code files as well as precompiled library code.

In some implementations, the system generates multiple call graphs, at least one call graph for each source code target. The system can alternatively or in addition generate a global call graph for every executable target that the build system will generate.

As part of this process, the system can also compute, for each of one or more functions, a call graph depth. The system can for example raise an error if the depth of the call graph for a particular function is too deep. In addition, the system can use the call graph depth to preallocate a stack size for a particular executable.

The system optionally obtains non-source-code annotations (230). Non-source-code annotations are other indicators of real-time annotation values that do not occur within the source code itself. One example use for non-source-code annotations is for source code that cannot be modified by developers of the real-time software. This non-modifiable code can include operating system-level functions as well as third-party software functions.

The system can use any appropriate technique to associate function names with non-source-code real-time annotation values. For example, the system can use a lookup table or a database. Then, if any of the functions in the call graph are associated with non-source-code annotations, e.g., by virtue of having an entry in a lookup table or a database, the system can retrieve the real-time annotation values for those functions.

One example is particular system functions that tend to have nondeterministic runtimes. These include system functions that relate to thread management, e.g., to yield, sleep, or create a thread; system functions that relate to allocating and deallocating memory or other storage space; functions that communicate with other threads, e.g., using remote-procedure calls and networking calls. A real-time code analysis system can consider these types of memory allocation functions not to be real-time safe. Thus, the system can associate the names of these functions with the non-real-time only annotation value.

Another example is third-party software functions that provide real-time execution and control. For example, a manufacturer of a robot can provide real-time libraries for real-time software control of a robot. The functions of this library may not be modifiable by developers analyzing the code base. Thus, the developers can associate function names in the real-time software with real-time annotation values that indicate that these functions should be checked for real-time safety. For example, it may be useful to know that a manufacturer of a robot is shipping real-time code that performs memory allocations. This mechanism of specifying real-time annotation values for non-modifiable code provides for an additional real-time safety check that can identify likely problems that would otherwise have gone unnoticed.

The system traverses the call graph to identify real-time violations (240). The system can perform any appropriate search through the graph in order to identify real-time violations, e.g., depth-first search or breadth-first search.

A real-time violation is data that represents an instance in the source code that violates one or more real-time safe criteria. One example of a real-time safe criterion is that no real-time function to be executed in the real-time subsystem should ever call or transitively call a function having the non-real-time only annotation value. This can also mean that in order to satisfy the real-time safe criterion, every function that has the check real-time safe annotation value can only call other functions that also have check real-time safe annotation values. If the system identifies an instance in the call graph in which one or both of these conditions is not satisfied, the system can designate that instance a real-time violation.

Other real-time safe criteria can also be used. Another example is aggregate worst-case run time. The system can analyze each node in the call graph and compute an estimated worst-case run time based on the number of instructions, the iterations of loops, and the sizes of the data being processed, to name just a few examples. While performing the search through the graph, the system can repeatedly update the aggregate worst-case run time value for the function currently being analyzed. If the aggregate worst-case run time exceeds a threshold value for the real-time subsystem, the system can designate that instance as a real-time violation.

Another example of a criteria that the system can analyze is aggregate cyclomatic complexity. Cyclomatic complexity is a measure of the number of linearly independent paths through the source code. While performing the search through the graph, the system can compute an aggregate cyclomatic complexity measure from the root node to the node currently being analyzed. If the aggregate cyclomatic complexity exceeds a threshold value, the system can designate that instance as a real-time violation.

The system generates messages for identified real-time violations (250). The system can generate a report that lists each instance of a real-time violation, along with metadata about the violation. The metadata can include a location within the code base, e.g., a line number and a file name, as well as a type of violation, e.g., a non-real-time call violation, a likely worst-case run time violation, or a cyclomatic complexity violation. In some implementations, the system grades the violations by severity and can prioritize the violations in the report by severity. For example, the system can grade some violations as warnings and some as errors. For worst-case run time, for example, the system can grade a violation as a warning if the worst-case run time exceeds a first threshold and as an error if it exceeds a second threshold. The system can then provide the report back to a user device for presentation to a user that requested the real-time code analysis.

A detailed example of performing real-time code analysis will now be described. In the following example pseudocode files, two real-time annotation values are used: "@@ NON_REAL_TIME_ONLY_" to denote a non-real-time only annotation value, and "@@ CHECK_REAL_TIME_SAFE" to denote a check real-time safe annotation value. The double commercial at characters are real-time annotation delimiters that will be inspected by a real-time code analysis tool, but ignored by a compiler.

TABLE 1 illustrates example pseudocode having three functions with real-time annotations. In this example, all functions occur in the same source code file, but in practice, the real-time analysis can be performed for functions occurring in an arbitrarily large number of files in a code base.

TABLE 1

| 1 | @@ NON_REAL_TIME_ONLY_ |
| 2 | def setup_buffer(size) |
| 3 | return sys.malloc(size) |
| 4 | |
| 5 | @@ NON_REAL_TIME_ONLY_ |
| 6 | def system_run( ) |
| 7 | setup_buffer( ) |

TABLE 1-continued

| 8  | execute( )               |
|----|--------------------------|
| 9  |                          |
| 10 | @@ CHECK_REAL_TIME_SAFE  |
| 11 | def execute( )           |
| 12 | joint_move( )            |
| 13 | gripper_close( )         |

On line 2, a function "setup buffer" is defined. The setup_buffer function is an example of an initialization routine that is safe to execute on a real-time system before crossing the real-time execution boundary. The setup_buffer function has an attached real-time annotation on line 1 that declares this function to be non-real-time only, which means that setup_buffer should not be called from code that is executing in real-time. This can be because a developer has noticed that the function includes a system memory allocation function, "sys.malloc", which, as described above, is the type of function that commonly has a nondeterministic runtime.

On line 6, a function "system_run" is defined. The system_run function has an attached real-time annotation on line 5 that declares this function to be non-real-time only, which means that system_run should not be called from code that is executing in real-time.

On line 11, a function "execute" is defined. The execute function has an attached real-time annotation on line 10 that declares that the function should be checked for real-time safety. The function "execute" calls two other functions, "joint_move" on line 12 and "gripper_close" on line 13, which are robot movements implemented by third-party software.

Figure 3:
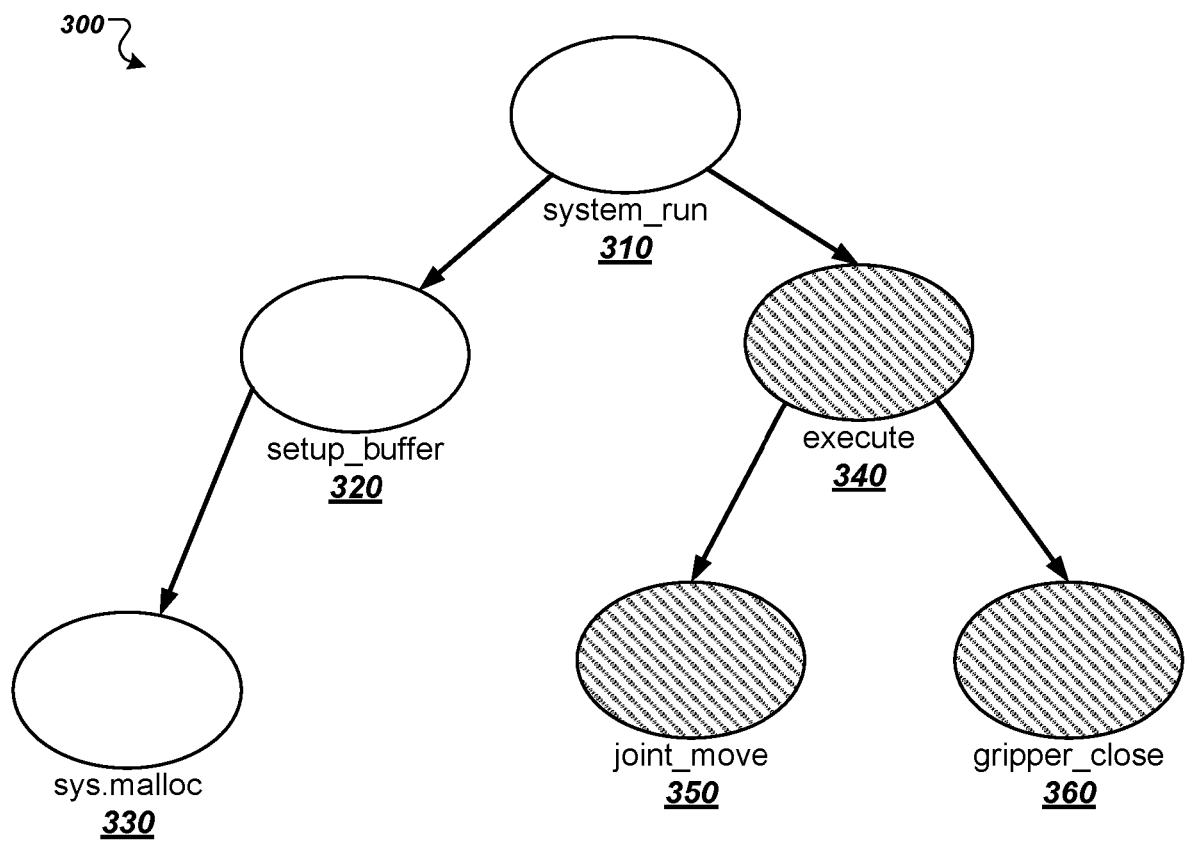
FIG. 3 illustrates a call graph for the source code in TABLE 1.

FIG. 3 illustrates a call graph 300 for the source code in TABLE 1. The system can use the real-time annotations in the source code in TABLE 1 as well as other non-source-code real-time annotations, e.g., from a lookup table or a database, to determine real-time annotation values for each node in the graph. For example, the system can use a lookup table to determine that the operating system function sys.malloc has a non-real-time only annotation value while the third-party software functions joint_move and gripper_close both have check real-time safe annotation values.

As illustrated, nodes for functions having the non-real-time only annotation value have no fill pattern. In contrast, nodes for functions having the check real-time safe annotation value are illustrated with a hatched fill pattern.

The program in TABLE 1 generates no real-time violations because, as can be seen from the graph 300, there are no edges from a check real-time safe node to a non-real-time only node.

TABLE 2 illustrates another example of pseudocode having real-time annotations.

TABLE 2

| 1  | @@ NON_REAL_TIME_ONLY_   |
|----|--------------------------|
| 2  | def setup_buffer(size)   |
| 3  | return sys.malloc(size)  |
| 4  |                          |
| 5  | @@ CHECK_REAL_TIME_SAFE  |
| 6  | def real_time_run( )     |
| 7  | joint_move( )            |
| 8  | for i:=1 to 30:          |
| 9  | gripper_close( )         |
| 10 |                          |
| 11 | @@ CHECK_REAL_TIME_SAFE  |
| 12 | def gripper_close( )     |
| 13 | buffer = setup_buffer(32)|

TABLE 2-continued

| 14 | for i:=1 to 100:         |
| 15 | decrease_grip_angle( )   |

On line 2, setup_buffer has the same annotation as in TABLE 1.

On line 6, a function "real_time_run" is defined. The real_time_run function has an attached real-time annotation on line 5 that declares that the function should be checked for real-time safety.

On line 12, a function "gripper_close" is defined. Unlike the example in TABLE 1, the body of gripper_close is included in the source code file itself rather than being defined in a third-party library. This can represent an instance of a developer wanting to write a custom implementation of this function for a particular application. Thus, the gripper_close function has a source code real-time annotation on line 11 that indicates that the function should be checked for real-time safety.

On line 15, the gripper_close function calls another function, "decrease_grip_angle." In this example, decrease_grip_angle is defined in a third-party software library, and non-source code annotation indicates that it should be checked for real-time safety.

Figure 4:
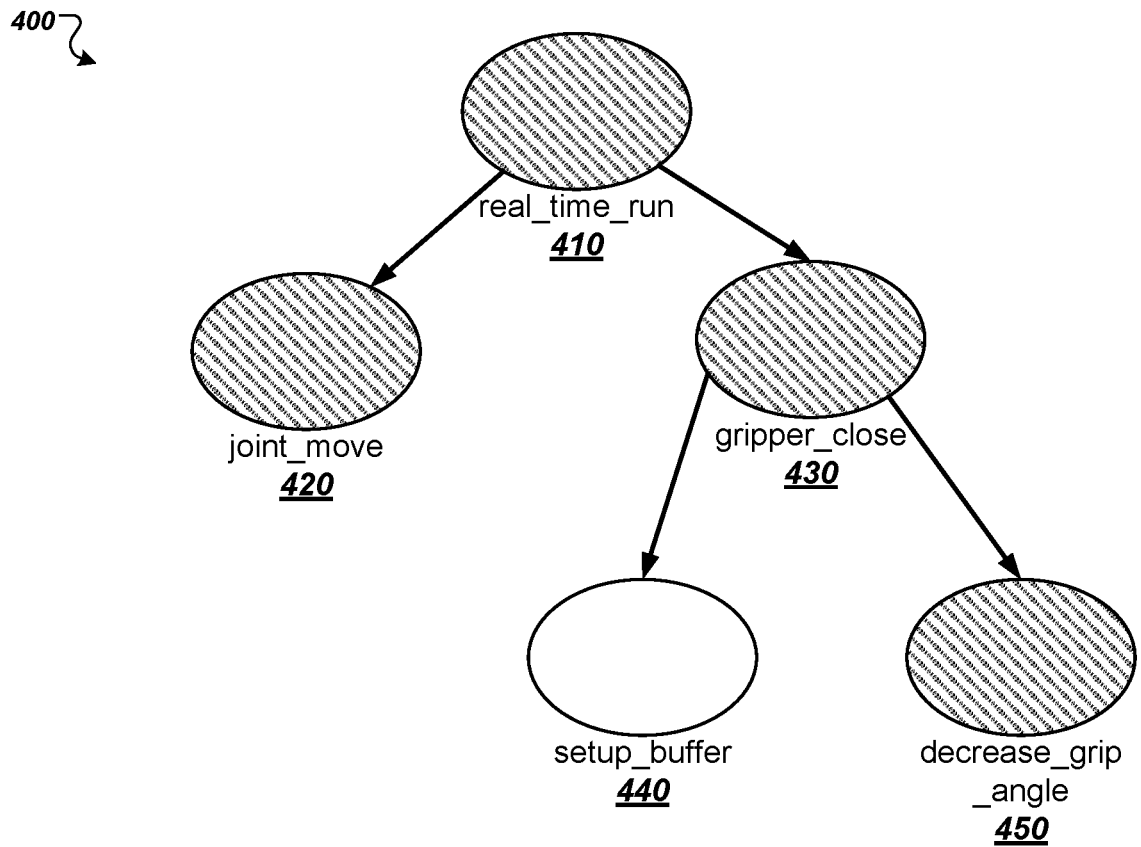
FIG. 4 illustrates a call graph for the source code in TABLE 2.

FIG. 4 illustrates a call graph 400 for the source code in TABLE 2. The nodes of the graph are also illustrated as having no fill pattern for non-real-time only functions and having a hatched fill pattern for check real-time safe functions.

As shown in the call graph 400, the check real-time safe function gripper_close calls a non-real-time only function setup_buffer 440. Thus, the program in TABLE 2 has a real-time violation on line 12. The system could thus generate a report stating that a violation occurs on line 12, and listing the violation type as an instance of a check real-time safe function calling a non-real-time only function.

A potential worst-case run time violation occurs on line 15 of TABLE 2. For example, the system can use the call graph and the number of iterations in each node for real_time_run and gripper_close to determine that the worst-case run time exceeds a threshold value. This is due to decrease_grip_angle being called 3000 times from real_time_run. A developer can use this information to determine that too much processing is being performed in one time window and therefore refactor the real-time code so that the real-time time windows are obeyed.

Some aspects of the techniques described above can be implemented on parallel computing hardware. This is useful because the size of the call graphs in real-world code bases can be quite large. Thus, the system can distribute a different portions of the call graph or a different traversal paths to each of many computing nodes in order to perform the analysis in parallel.

Alternatively or in addition, the system can raise an error based on which functions should have been called but were not. For example, if setup_buffer is called before any real-time safe code, then there may not be an error. But if it is not, then an error may exist because setup_buffer should have been called before the real-time safe code.

A computer system can use some of the techniques described above to also perform dynamic analysis of real-time software. For example, the compiler can use the annotations to generate instrumented code that detects violations while the code is executing. In that instance, the robot can automatically enter a fault state. In addition, the techniques described above can be implemented as part of a continuous workflow system that automatically checks for errors overnight or with each newly checked in portion of code.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a request to perform real-time code analysis on source code, wherein the request identifies one or more target source code elements;

identifying a plurality of real-time annotation values occurring in the source code for the target source code elements;

generating a call graph for the one or more target source code elements, wherein the call graph having nodes and edges, wherein each node represents a respective target source code element or a function called directly or transitively by each target source code element, and wherein each edge between a first node and a second node represents that a first function represented by the first node calls a second function represented by the second node;

traversing the call graph to identify one or more real-time violations, wherein each real-time violation is an instance in the source code that violates one or more real-time safe criteria; and providing, in response to the request, an output that identifies one or more of the real-time violations occurring in the source code.

Embodiment 2 is the method of embodiment 1, wherein the real-time annotation values comprise a check real-time safe value, and wherein identifying the one or more real-time violations comprises identifying an instance of a function having a check real-time safe annotation value calling a function that does not have a check real-time safe annotation value.

Embodiment 3 is the method of any one of embodiments 1-2, wherein the real-time annotation values comprise a check real-time safe value and a non-real-time only value, and wherein identifying the one or more real-time violations comprises identifying an instance of a function having a check real-time safe annotation value directly or transitively calling a function having a non-real-time only annotation value.

Embodiment 4 is the method of any one of embodiments 1-3, further comprising:

obtaining one or more non-source-code annotations for one or more functions called directly or transitively by one or more of the target source code elements, and wherein identifying the one or more real-time violations comprises identifying a real-time violation from a non-source-code annotation value.

Embodiment 5 is the method of embodiment 4, wherein obtaining one or more non-source-code annotations for one or more functions called directly or transitively by one or more of the target source code elements comprises obtaining the names of system functions called directly or transitively by a target source code element and associating the system functions with a non-real-time only annotation value.

Embodiment 6 is the method of embodiment 5, wherein obtaining one or more non-source-code annotations for one or more functions called directly or transitively by one or more of the target source code elements comprises obtaining the names of system functions that perform thread management or memory management operations.

Embodiment 7 is the method of embodiment 4, wherein obtaining one or more non-source-code annotations for one or more functions called directly or transitively by one or more of the target source code elements comprises obtaining the names of library functions for performing real-time software control and associating the library functions with a check real-time safe annotation value.

Embodiment 8 is the method of any one of embodiments 1-7, wherein identifying one or more real-time violations comprises identifying a path in the call graph having an aggregate worst-case run time value that exceeds a threshold.

Embodiment 9 is the method of any one of embodiments 1-8, wherein the real-time annotation values occurring in the source code are text sequences that are ignored by a compiler for the source code.

Embodiment 10 is the method of any one of embodiments 1-9, wherein the request to perform real-time code analysis on source code is a request to perform real-time code analysis on a plurality of files in a code base.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   receiving a request to perform real-time code analysis on source code, wherein the request identifies one or more target source code elements;
   identifying a plurality of user-specified real-time annotation values occurring in the source code for the target source code elements, including identifying one or more real-time functions annotated with a check real-time safe annotation value and one or more non-real-time functions annotated with a non-real-time-only annotation value;
   generating a call graph for the one or more target source code elements, wherein the call graph has nodes and edges, wherein each node represents a respective target source code element or a function called directly or transitively by each target source code element, and wherein each edge between a first node and a second node represents that a first function represented by the first node calls a second function represented by the second node;
   traversing the call graph to identify one or more real-time violations, including identifying one or more invocations of the real-time functions calling non-real-time functions directly or transitively, wherein each real-time violation is an instance in the source code that violates one or more real-time safe criteria; and
   providing, in response to the request, an output that identifies one or more of the real-time violations occurring in the source code.

2. The method of claim 1, wherein identifying the one or more real-time violations further comprises identifying an instance of a real-time function annotated with a check real-time safe annotation value calling a function that is not annotated with a check real-time safe annotation value.

3. The method of claim 1, further comprising:
   obtaining one or more non-source-code annotations for one or more functions called directly or transitively by one or more of the target source code elements, and
   wherein identifying the one or more real-time violations comprises identifying a real-time violation from a non-source-code annotation value.

4. The method of claim 3, wherein obtaining the one or more non-source-code annotations for the one or more functions called directly or transitively by one or more of the target source code elements comprises obtaining names of system functions called directly or transitively by a target source code element and associating the system functions with a non-real-time only annotation value.

5. The method of claim 4, wherein obtaining the one or more non-source-code annotations for the one or more functions called directly or transitively by one or more of the target source code elements comprises obtaining the names of system functions that perform thread management or memory management operations.

6. The method of claim 3, wherein obtaining the one or more non-source-code annotations for the one or more functions called directly or transitively by one or more of the target source code elements comprises obtaining names of library functions for performing real-time software control and associating the library functions with a check real-time safe annotation value.

7. The method of claim 1, wherein identifying the one or more real-time violations comprises identifying a path in the call graph having an aggregate worst-case run time value that exceeds a threshold.

8. The method of claim 1, wherein the real-time annotation values occurring in the source code are text sequences that are ignored by a compiler for the source code.

9. The method of claim 1, wherein the request to perform real-time code analysis on source code is a request to perform real-time code analysis on a plurality of files in a code base.

10. A system comprising:
    one or more computers and one or more storage devices storing instructions that are operable, when executed by the one or more computers, to cause the one or more computers to perform operations comprising:
    receiving a request to perform real-time code analysis on source code, wherein the request identifies one or more target source code elements;
    identifying a plurality of user-specified real-time annotation values occurring in the source code for the target source code elements, including identifying one or more real-time functions annotated with a check real-time safe annotation value and one or more non-real-time functions annotated with a non-real-time-only annotation value;
    generating a call graph for the one or more target source code elements, wherein the call graph has nodes and edges, wherein each node represents a respective target source code element or a function called directly or transitively by each target source code element, and wherein each edge between a first node and a second node represents that a first function represented by the first node calls a second function represented by the second node;
    traversing the call graph to identify one or more real-time violations, including identifying one or more invocations of the real-time functions calling non-real-time functions directly or transitively, wherein each real-time violation is an instance in the source code that violates one or more real-time safe criteria; and
    providing, in response to the request, an output that identifies one or more of the real-time violations occurring in the source code.

11. The system of claim 10, wherein identifying the one or more real-time violations further comprises identifying an instance of a real-time function annotated with a check real-time safe annotation value calling a function that is not annotated with a check real-time safe annotation value.

12. The system of claim 10, wherein the operations further comprise:
obtaining one or more non-source-code annotations for one or more functions called directly or transitively by one or more of the target source code elements, and
wherein identifying the one or more real-time violations comprises identifying a real-time violation from a non-source-code annotation value.

13. The system of claim 12, wherein obtaining the one or more non-source-code annotations for the one or more functions called directly or transitively by one or more of the target source code elements comprises obtaining names of system functions called directly or transitively by a target source code element and associating the system functions with a non-real-time only annotation value.

14. The system of claim 13, wherein obtaining the one or more non-source-code annotations for the one or more functions called directly or transitively by one or more of the target source code elements comprises obtaining the names of system functions that perform thread management or memory management operations.

15. The system of claim 12, wherein obtaining the one or more non-source-code annotations for the one or more functions called directly or transitively by one or more of the target source code elements comprises obtaining names of library functions for performing real-time software control and associating the library functions with a check real-time safe annotation value.

16. The system of claim 10, wherein identifying the one or more real-time violations comprises identifying a path in the call graph having an aggregate worst-case run time value that exceeds a threshold.

17. The system of claim 10, wherein the real-time annotation values occurring in the source code are text sequences that are ignored by a compiler for the source code.

18. One or more non-transitory computer storage media encoded with computer program instructions that when executed by one or more computers cause the one or more computers to perform operations comprising:
receiving a request to perform real-time code analysis on source code, wherein the request identifies one or more target source code elements;
identifying a plurality of user-specified real-time annotation values occurring in the source code for the target source code elements, including identifying one or more real-time functions annotated with a check real-time safe annotation value and one or more non-real-time functions annotated with a non-real-time-only annotation value;
generating a call graph for the one or more target source code elements, wherein the call graph has nodes and edges, wherein each node represents a respective target source code element or a function called directly or transitively by each target source code element, and wherein each edge between a first node and a second node represents that a first function represented by the first node calls a second function represented by the second node;
traversing the call graph to identify one or more real-time violations, including identifying one or more invocations of the real-time functions calling non-real-time functions directly or transitively, wherein each real-time violation is an instance in the source code that violates one or more real-time safe criteria; and
providing, in response to the request, an output that identifies one or more of the real-time violations occurring in the source code.

* * * * *